(12) United States Patent
Kume

(10) Patent No.: US 8,102,441 B2
(45) Date of Patent: Jan. 24, 2012

(54) SOLID-STATE IMAGING APPARATUS

(75) Inventor: Atsuko Kume, Sagamihara (JP)

(73) Assignee: Olympus Corporation, Tokyo (JP)

( * ) Notice: Subject to any disclaimer, the term of this patent is extended or adjusted under 35 U.S.C. 154(b) by 443 days.

(21) Appl. No.: 12/060,591

(22) Filed: Apr. 1, 2008

(65) Prior Publication Data

US 2008/0239108 A1 Oct. 2, 2008

(30) Foreign Application Priority Data

Apr. 2, 2007 (JP) .................................. 2007-96145

(51) Int. Cl.
*H04N 5/217* (2011.01)
*H04N 5/335* (2011.01)
*H05G 1/64* (2006.01)
(52) U.S. Cl. ........................ 348/241; 241/300; 378/98.8
(58) Field of Classification Search ............... 348/222.1, 348/241, 294, 300; 378/98.8
See application file for complete search history.

(56) References Cited

U.S. PATENT DOCUMENTS

| 6,731,720 B2 * | 5/2004 | Matsuura ..................... 378/98.8 |
| 7,567,280 B2 * | 7/2009 | Muramatsu et al. .......... 348/294 |
| 2002/0051067 A1 * | 5/2002 | Henderson et al. ........... 348/241 |

FOREIGN PATENT DOCUMENTS

JP 2002320141 A 10/2002

* cited by examiner

*Primary Examiner* — Trung Diep
(74) *Attorney, Agent, or Firm* — Westerman, Hattori, Daniels & Adrian, LLP

(57) ABSTRACT

A solid-state imaging apparatus including: a pixel section with a plurality of pixels arranged into two dimensions, each having a photoelectric conversion section for effecting photoelectric conversion, an accumulation section for temporarily storing a signal generated at the photoelectric conversion section, a transfer means for transferring the signal of the photoelectric conversion section to the accumulation section, a reset means for resetting the accumulation section, an amplification means for amplifying and outputting an electric potential of the accumulation section, and a select means for selecting the amplification means; and a noise suppressing circuit for suppressing a variance of a signal at the time of reset of each pixel, having a switch section for switching a polarity of a difference between a first signal and a second signal that are different in a characteristic due to pixel.

4 Claims, 16 Drawing Sheets

US 8,102,441 B2

SOLID-STATE IMAGING APPARATUS

This application claims benefit of Japanese Patent Application No. 2007-96145 filed in Japan Apr. 2, 2007, the contents of which are incorporated by this reference.

BACKGROUND OF THE INVENTION

The present invention relates to solid-state imaging apparatus that are used for example in digital cameras and digital video cameras.

There are two read methods in MOS-type solid-state imaging apparatus, namely, the method of reading light signal with using a rolling shutter function where signal accumulation of photoelectric conversion section is started/ended row by row, and the method of reading light signal with using a global shutter function where signal accumulation of the photoelectric conversion section is started/ended simultaneously of all pixels. These methods have both merits and demerits, and imaging apparatus where switching is made between the above described read functions depending on photographing conditions to obtain better results have been proposed for example in Japanese Patent Application Laid-Open 2000-320141.

FIG. 1 is a block diagram schematically showing a fundamental construction of prior-art solid-state imaging apparatus. The construction of this example includes at least: a pixel array 1 consisting of a plurality of pixels for receiving light and outputting signal; a vertical scanning circuit 2 for controlling the pixel array 1; a noise suppressing circuit 4 for processing and retaining signal outputted from pixel; and a horizontal scanning circuit 5. It should be noted that, in FIG. 1, numeral 6 denotes an output amplifier connected to an output signal line from the noise suppressing circuit 4. FIG. 2 is a circuit diagram showing an actual construction of the prior-art solid-state imaging apparatus; and FIG. 3 is a timing chart for explaining an operation of the noise suppressing circuit when the rolling shutter function is used. FIG. 4 is a timing chart for explaining an operation of the noise suppressing circuit when the global shutter function is used. FIG. 5 is a timing chart for explaining a light signal accumulation timing when the global shutter function is used. FIG. 6 is a timing chart for explaining a light signal accumulation timing when the rolling shutter function is used.

FIG. 2 will now be used to describe actual construction of the prior-art solid-state imaging apparatus. At first, construction of pixel will be described by way of a pixel PIX11 as an example. Those provided within the pixel PIX11 include: a photoelectric conversion section PD11; a memory (FD) C11 for accumulating signal generated at the photoelectric conversion section PD11; a transfer switch MT11 for controlling transfer from the photoelectric conversion section PD11 to the memory C11; a reset switch MR11 for resetting the memory C11; an amplification section MA11 for amplifying signal of the memory C11; and a select switch MS11 for selecting the pixel. These components are connected as shown in FIG. 2. A plurality of pixels having such construction are two-dimensionally arranged to form a pixel array 1. In this example, the pixel array 1 is shown as formed of pixels PIX11 to PIX33 that are arranged into three rows by three columns.

The transfer switch MT11 is controlled by a transfer control signal φTR1. The reset switch MR11 is controlled by a reset control signal φRS1. The select switch MS11 is controlled by a select control signal φSEL1 so that the pixel signals of selected pixel row are outputted to the noise suppressing circuit 4. At the noise suppressing circuit 4, signals of value after eliminating reset variance of pixel are retained. Subsequently, the signals retained at the noise suppressing circuit 4 are read out by the horizontal scanning circuit 5 and are outputted through an output signal line and the output amplifier 6. In FIG. 2, numeral 7 denotes a pixel power supply, and I41 (I42, I43) is a biasing current supply connected to the vertical signal line.

An accumulation timing of light signal when using the rolling shutter function in thus constructed solid-state imaging apparatus will now be described by way of the timing chart shown in FIG. 6. At first, the transfer control signal φTR1 and reset control signal φRS1 are driven to high level to reset the photoelectric conversion section PD of the pixels of the row (first row) controlled by the two control signals φTR1, φRS1. Subsequently, an accumulation of light signal is started by bringing the transfer control signal φTR1 and reset control signal φRS1 to low level. After that, the transfer control signal φTR2 and reset control signal φRS2 are driven to high level to effect reset of the photoelectric conversion sections PD of the row (second row) controlled by the two control signals φTR2, φRS2. Subsequently, an accumulation of light signal is started by bringing the transfer control signal φTR2 and reset control signal φRS2 to low level.

In a similar manner, the transfer control signals and reset control signals of the rows of the third and after are driven as described so that the photoelectric conversion sections PD of each row are caused to start an accumulation of light signal. After passage of a predetermined time from the start of accumulation of light signal, pixel signals of the row controlled by the select control signal are outputted. At first, the select control signal φSEL1 is driven to high level to select the row (first row). Next, the reset control signal φRS1 is driven to high level to reset the memory (FD) of the pixels of the first row, and then the reset control signal φRS1 is brought to low level to end the resetting of the memory (FD). At this time, a reset signal is outputted from the pixels of the first row. After that, the transfer control signal φTR1 is driven to high level to transfer the light signal accumulated at the photoelectric conversion section PD of the pixels of the first row to the memory (FD), and then the transfer control signal φTR1 is brought to low level to end the transfer. At this time, a light signal is outputted from pixel. Finally, the select control signal φSEL1 is brought to low level to end the reading of the pixel signals of the selected first row.

Next, the row (second row) selected by the select control signal φSEL2 is read out. This operation is similar to the operation of the first row and will not be described. In the operation using the rolling shutter function of the above, the start time and end time of accumulation of light signal are respectively different from one row to another.

An accumulation timing of light signal when using the global shutter function will now be described by way of the timing chart shown in FIG. 5. At first, the transfer control signals φTR1, TR2, TR3, . . . , of all rows, and the reset control signals φRS1, RS2, RS3, . . . , of all rows are simultaneously driven to high level to concurrently reset the photoelectric conversion section PD of all pixels. After that, the transfer control signals and the reset control signals are brought to low level to start accumulation of light signal. After passage of a predetermined time, the transfer control signals φTR1, TR2, TR3, . . . , of all rows are driven to high level to transfer the light signal accumulated at the photoelectric conversion section PD to the memory (FD) concurrently of all pixels and to thereby end an accumulation of light signal.

Next, pixel signal output of the row selected by the select control signal is effected. First, the pixels of the first row are selected by driving the select control signal φSEL1 to high level to output a light signal. Next, the reset control signal φ RS1 is driven to high level to reset the memory (FD) of the pixels of the first row, and then the reset control signal φ RS1 is brought to low level to end the resetting of the memory (FD). At this time, a reset signal is outputted from the pixels of the first row. Finally, the select control signal φ SEL1 is brought to low level to end the outputting of the pixel signals of the first row. After that, the pixel signal output of the row (second row) selected by the select control signal φ SEL2 is started. Subsequently in a similar manner, the pixel signals of the third row and after are outputted. In the operation using the global shutter function of the above, the start time and end time of light signal accumulation are the same from one row to another.

An operation of the noise suppressing circuit when using the rolling shutter function will be described below by way of the timing chart shown in FIG. 3. The operation of pixel will now be described. The select control signal φ SEL1 is driven to high level to select the row (first row) from which the pixel signals are to be read. The reset signals are read out before the reading of light signal from the photoelectric conversion section PD. In particular, the reset control signal φ RS1 is driven to high level at first to reset the memory (FD), and then the reset control signal φ RS1 is brought to low level to end the resetting of the memory (FD). A reset signal Vr of the pixel is thereby outputted to the noise suppressing circuit 4. Next, the transfer control signal φ TR1 is driven to high level to transfer the signal accumulated at the photoelectric conversion section PD to the memory (FD). A signal (Vr+Vs) where a light signal Vs is overlapped on reset signal Vr is thereby outputted from pixel to the noise suppressing circuit 4. Finally, the select control signal φ SEL1 is brought to low level to end the reading of pixel signal.

An operation of the noise suppressing circuit 4 for processing signal outputted from pixel will now be described with noticing the pixel signal of pixel PIX11. A sample-and-hold control signal φ SH and clamp control signal φ CL are driven to high level to clamp a node N2 of the noise suppressing circuit 4 by a clamping voltage (Vref) 8. At this time, the reset signal Vr is inputted to the noise suppressing circuit 4 from pixel so that the reset signal Vr is sampled by means of a clamping capacitor CCL1. Next, the clamp control signal φ CL is brought to low level to end the sampling of the reset signal Vr.

Subsequently, the signal (Vr+Vs) where the light signal Vs is overlapped on the reset signal Vr is inputted to the noise suppressing circuit 4 from the pixel. The node N2 of the noise suppressing circuit 4 at that time attains voltage GVs which is obtained by multiplication of a difference signal Vs between the previously sampled reset signal Vr and the (Vr+Vs) signal inputted from pixel by gain G to be determined by the clamping capacitor CCL1 and the sampling capacitor CSH1. Subsequently, the voltage GVs of the node N2 is retained at the sampling capacitor CSH1 by bringing the sample-and-hold control signal φ SH to low level. The gain G is expressed by the following equation.

$$G=CCL1/(CCL1+CSH1)$$

By effecting the operation of the above, it is possible to output the signal GVs obtained by amplifying the light signal accumulated at the photoelectric conversion section PD.

An operation of the noise suppressing circuit 4 when using the global shutter function will be described below by way of the timing chart shown in FIG. 4. The operation of pixel will now be described. The transfer control signal φ TR1 is driven to high level so that signal accumulated at the photoelectric conversion section PD of pixel is transferred to the memory (FD). At this time, a signal obtained by overlapping the reset signal and the light signal upon each other is retained at the memory (FD).

Next, the select control signal φ SEL1 is driven to high level to select the row (first row) from which the pixel signals are to be read, and signal (Vr+Vs) where the reset signal Vr and the light signal Vs are overlapped on each other is outputted from the pixel. Subsequently, the reset control signal φ RS1 is driven to high level to reset the memory (FD). Next, the reset control signal φ RS1 is brought to low level to end the resetting of the memory (FD), and the reset signal Vr of the pixel is outputted to the noise suppressing circuit 4. Finally, the select control signal φ SEL1 is brought to low level to end the reading of the pixel signal.

An operation of the noise suppressing circuit 4 for processing signal outputted from pixel will now be described. The sample-and-hold control signal φ SH and the clamp control signal φ CL are driven to high level so that node N2 of the noise suppressing circuit 4 is clamped by means of a clamp voltage (Vref) 8. At this time, a signal (Vr+Vs) where the reset signal Vr and the light signal Vs are overlapped on each other is inputted to the noise suppressing circuit 4 from the pixel, and the overlapping signal (Vr+Vs) is sampled by means of the clamping capacitor CCL1. Next, the clamp control signal φ CL is brought to low level to end the sampling of the signal (Vr+Vs).

Subsequently, the reset signal Vr is inputted to the noise suppressing circuit 4 from the pixel. The node N2 of the noise suppressing circuit 4 at that time attains voltage –GVs which is obtained by multiplication of signal–Vs, i.e. the difference between the previously sampled signal (Vr+Vs) and the reset signal Vr inputted from the pixel by gain G to be determined by the clamping capacitor CCL1 and the sampling capacitor CSH1. Subsequently, the voltage –GVs of the node N2 is retained at the sampling capacitor CSH1 by bringing the sample-and-hold control signal φ SH to low level. By performing the above operation, it is possible to output the signal –GVs obtained by amplifying the light signal accumulated at the photoelectric conversion section PD. The light signal can be read out by performing the above operation.

SUMMARY OF THE INVENTION

In a first aspect of the invention, there is provided a solid-state imaging apparatus including: a pixel section with a plurality of pixels arranged into two dimensions, each having a photoelectric conversion section for effecting photoelectric conversion, an accumulation section for temporarily storing a signal generated at the photoelectric conversion section, a transfer means for transferring the signal of the photoelectric conversion section to the accumulation section, a reset means for resetting the accumulation section, an amplification means for amplifying and outputting an electric potential of the accumulation section, and a select means for selecting the amplification means; and a noise suppressing circuit for suppressing a variance of a signal at the time of reset of each pixel, having a switch section for switching a polarity of a difference between a first signal and a second signal that are different in a characteristic due to pixel.

In a second aspect of the invention, the solid-state imaging apparatus according to the first aspect further includes a mode setting section for setting a first read mode where a reset signal is caused to be outputted from the pixel as the first signal after resetting the accumulation section, and the signal subsequently generated at the photoelectric conversion section is transferred to the accumulation section and is caused to be outputted as the second signal, and a second read mode where the accumulation section is reset, and, after subsequently transferring the signal generated at the photoelectric conversion section to the accumulation section and causing it to be outputted from the pixel as the first signal, a resetting of the accumulation section is effected to output a reset signal from the pixel as the second signal. The switch section executes a switching of the polarity in accordance with a mode set by the mode setting section.

In a third aspect of the invention, when the second read mode is set in the solid-state imaging apparatus according to the second aspect, the transfer means is controlled so that signals generated at the photoelectric conversion section are transferred concurrently of all pixels to the accumulation section.

In a fourth aspect of the invention, the solid-state imaging apparatus according to the first aspect further includes an analog-to-digital converter for converting an analog output signal of the noise suppressing circuit into a digital signal.

DESCRIPTION OF THE PREFERRED EMBODIMENTS

Some embodiments of the solid-state imaging apparatus according to the invention will be described below with reference to the drawings.

Embodiment 1

Figure 1:
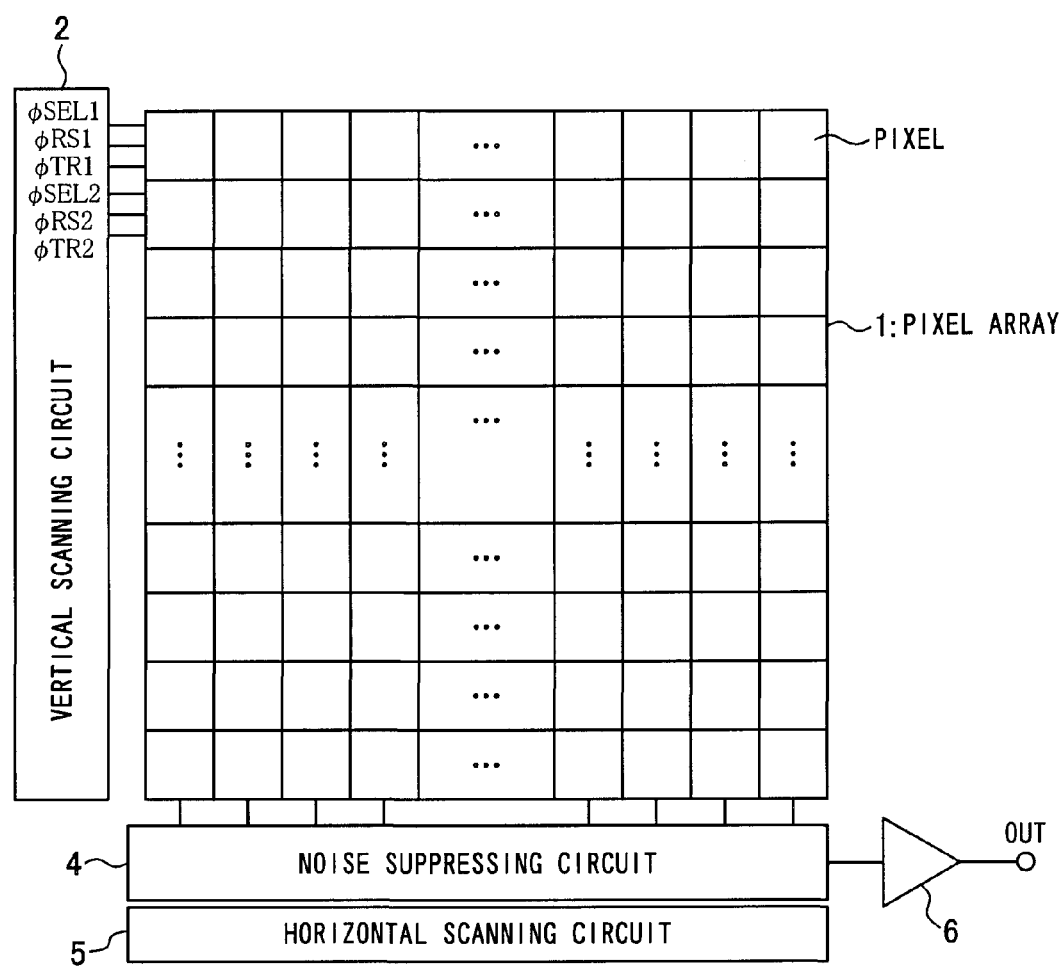
FIG. 1 is a block diagram showing construction of a prior-art solid-state imaging apparatus.
Figure 2:
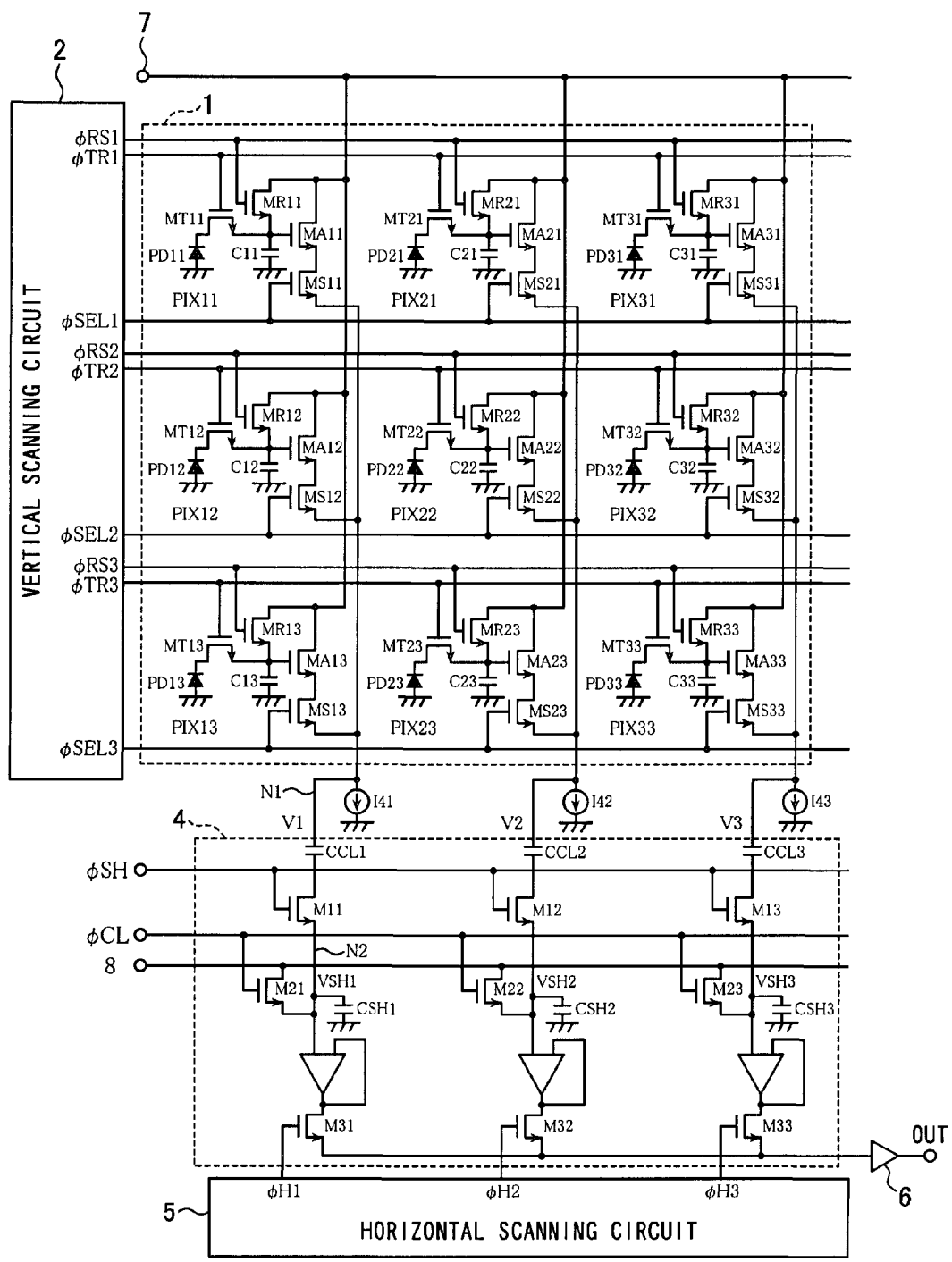
FIG. 2 is a circuit diagram showing construction of a pixel array and a noise suppressing circuit in the prior-art example shown in FIG. 1.
Figure 3:
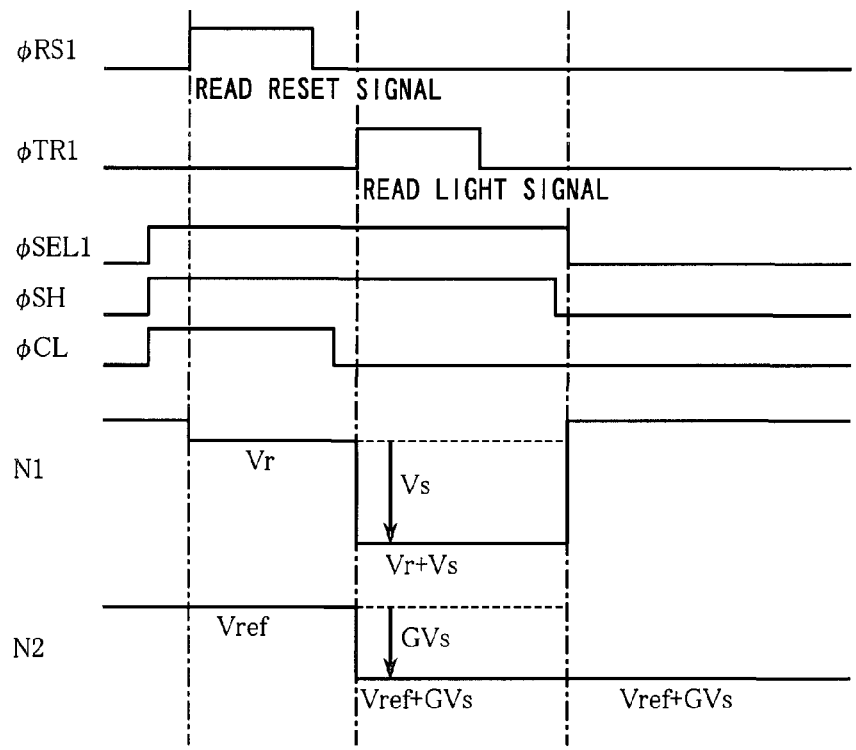
FIG. 3 is a timing chart for explaining an operation of the noise suppressing circuit when a rolling shutter function is used in the prior-art example shown in FIG. 2.
Figure 4:
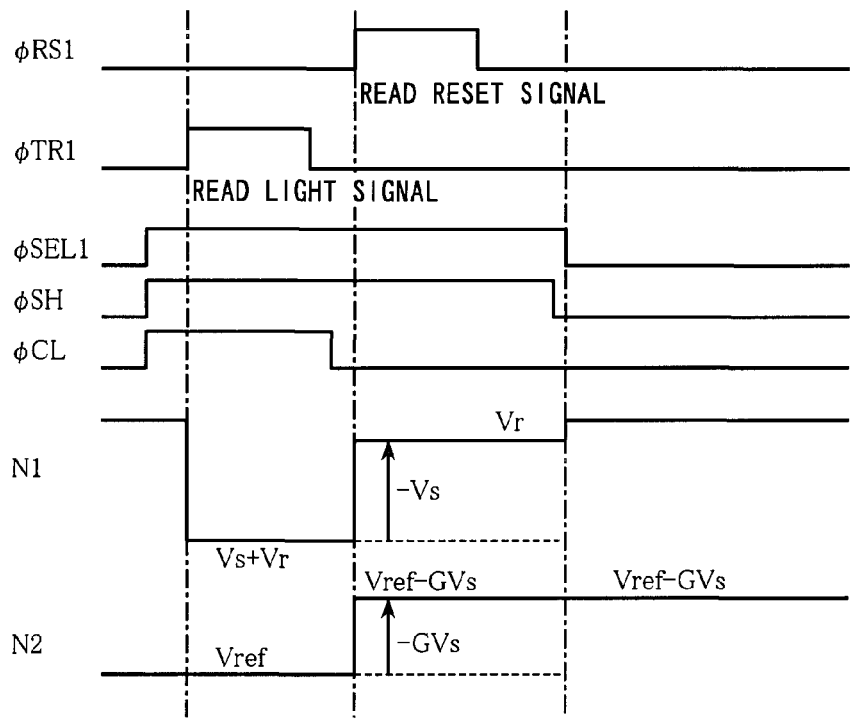
FIG. 4 is a timing chart for explaining an operation of the noise suppressing circuit when a global shutter function is used in the prior-art example shown in FIG. 2.
Figure 5:
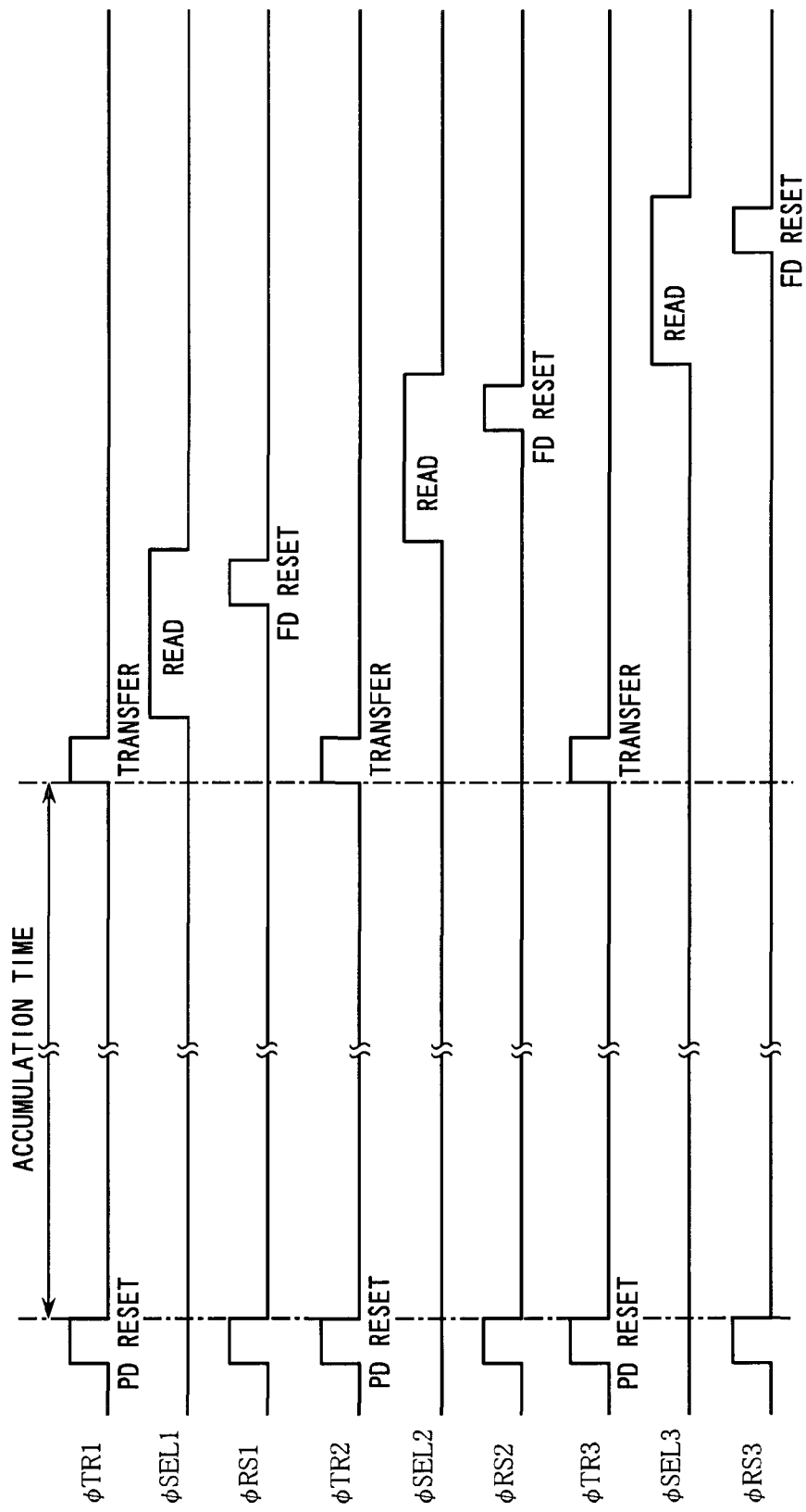
FIG. 5 is a timing chart for explaining an accumulation timing of light signal when the global shutter function is used in the prior-art example shown in FIG. 2.
Figure 6:
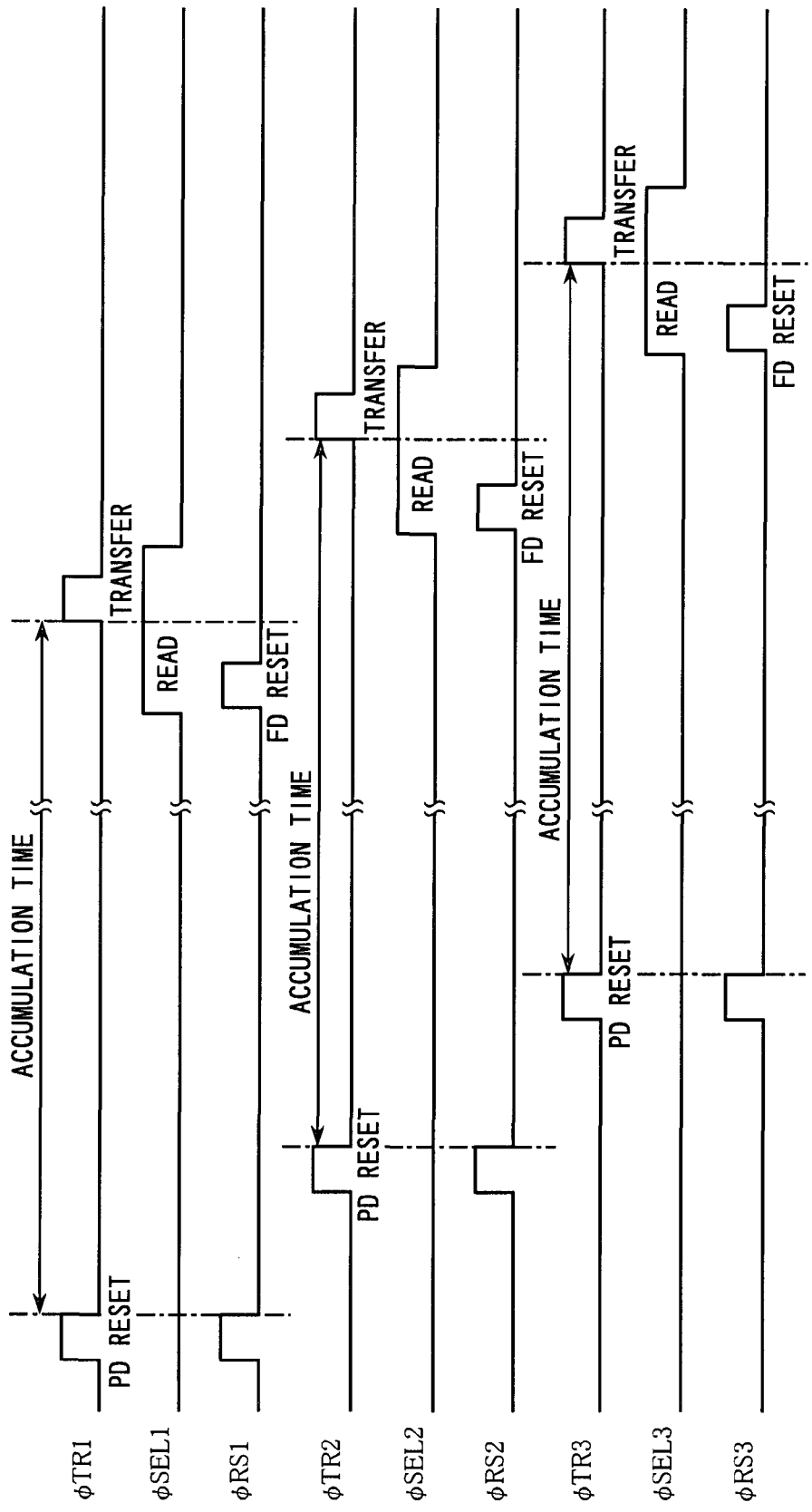
FIG. 6 is a timing chart for explaining an accumulation timing of light signal when the rolling shutter function is used in the prior-art example shown in FIG. 2.
Figure 7:
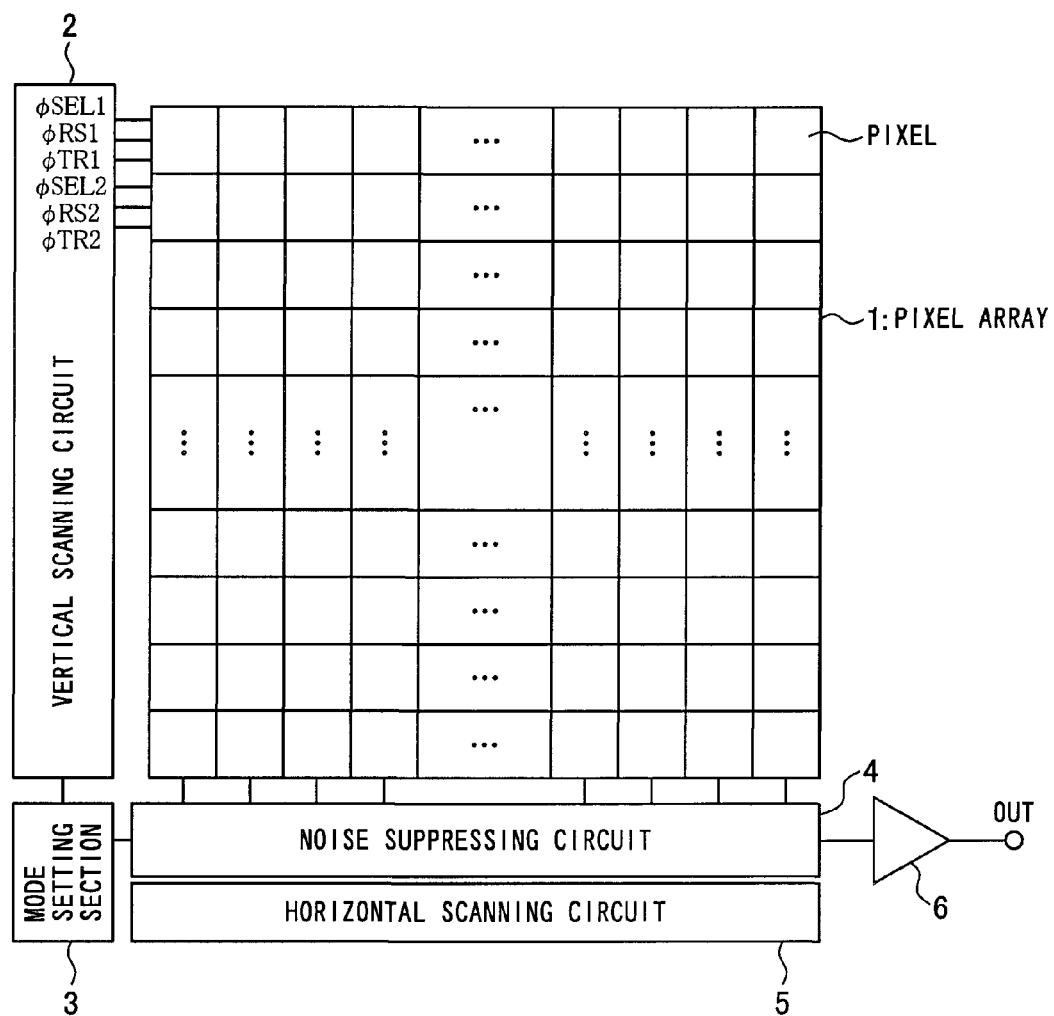
FIG. 7 is a block diagram schematically showing construction of a first embodiment of the solid-state imaging apparatus according to the invention.

A first embodiment of the solid-state imaging apparatus according to the invention will now be described. FIG. 7 is a block diagram schematically showing construction of the solid-state imaging apparatus according to the first embodiment, where like components as in the prior-art example shown in FIG. 1 are denoted by like reference numerals. The solid-state imaging apparatus according to the first embodiment at least includes: a pixel array 1 consisting of a plurality of pixels for receiving light and outputting signal; a vertical scanning circuit 2 for controlling the pixel array 1; a mode setting section 3; a noise suppressing circuit 4 having a function to control a polarity of output signal based on the mode selected by the mode setting section 3, for processing and retaining signals outputted from the pixels; and a horizontal scanning circuit 5. What is denoted by numeral 6 is an output amplifier connected to an output line from the noise suppressing circuit 4, and the mode setting section 3 is to also effect a switching control between a rolling shutter operation and a global shutter operation of the vertical scanning circuit 2.

Figure 8:
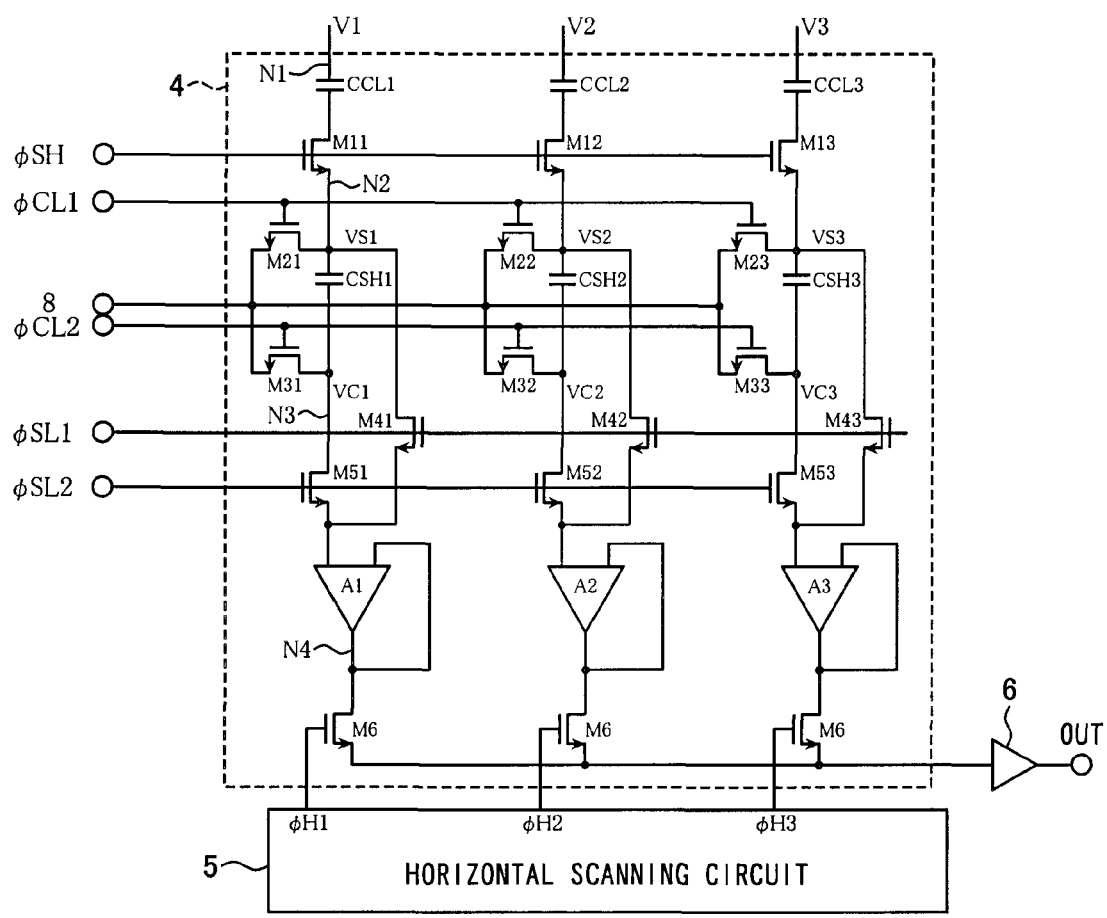
FIG. 8 is a circuit diagram showing construction of the noise suppressing circuit in the first embodiment shown in FIG. 7.

FIG. 8 is a circuit diagram showing construction of the noise suppressing circuit 4 in the solid-state imaging apparatus according to the first embodiment. Provided in the noise suppressing circuit 4 corresponding to output V1 of a first column of the pixel array 1 are: a clamping capacitor CCL1; a sampling capacitor CSH1; a sample-and-hold switch M11; clamp switches M21, M31; drive switches M41, M51; a horizontal select switch M6; and an amplifier A1. These components are connected as shown in FIG. 8. Circuits having similar construction are connected also to outputs V2, V3 that are from the other columns of the pixel array 1. The sample-and-hold switch M11 is controlled by a sample-and-hold control signal φ SH; the clamp switch M21 is controlled by a clamp control signal φ CL1; and the clamp switch M31 is controlled by a clamp control signal φ CL2. Further, the drive switch M41 and drive switch M51 are to be controlled by drive control signal φ SL1 and drive control signal φ SL2, respectively.

Figure 9:
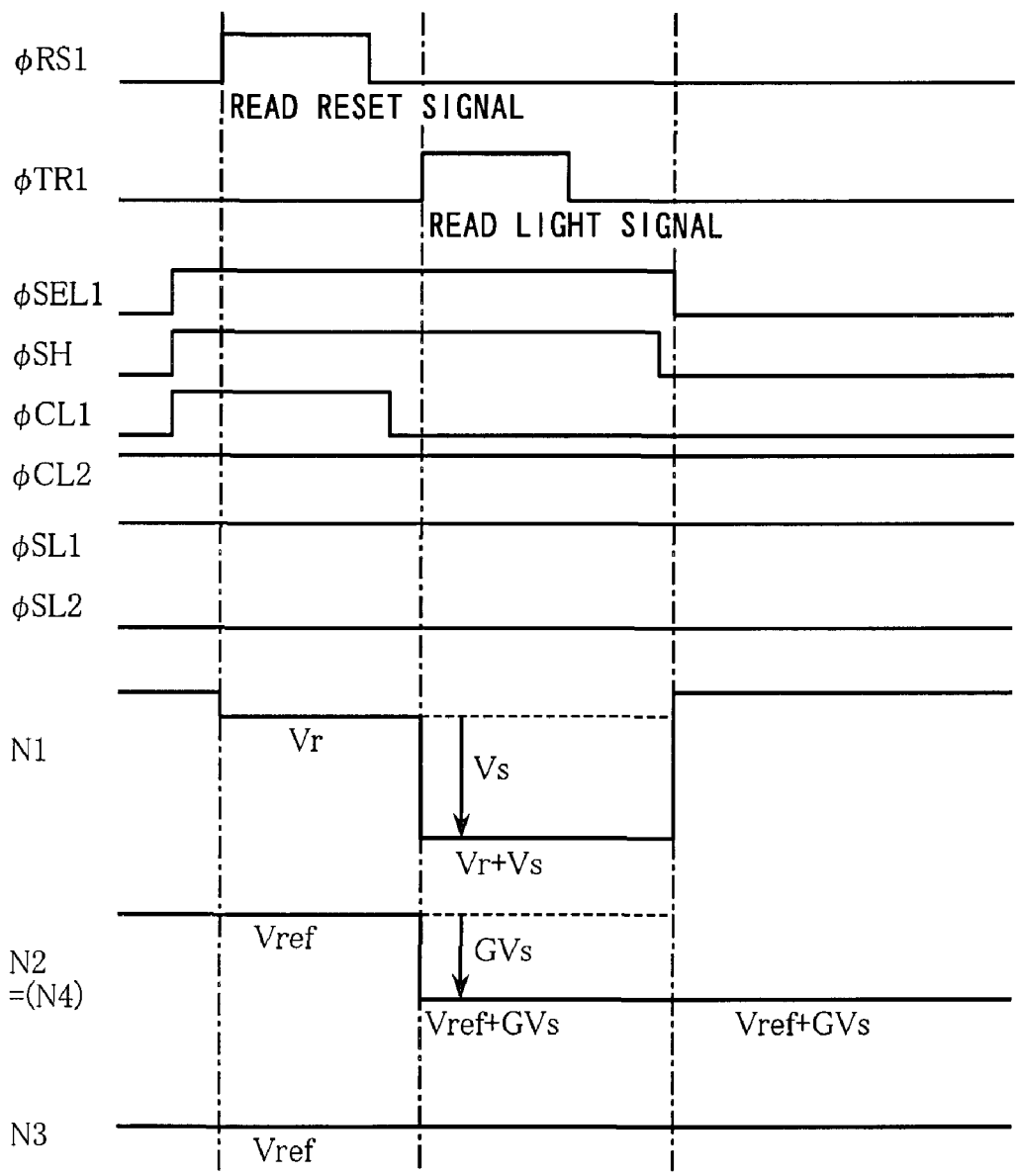
FIG. 9 is a timing chart for explaining an operation for reading a light signal with using a rolling shutter function in the first embodiment.

A description will be given below by way of a timing chart shown in FIG. 9 with respect to an operation for reading a light signal with using the rolling shutter function of the solid-state imaging apparatus according to the first embodiment having thus constructed noise suppressing circuit 4. The read operation of pixel is similar to the prior-art example and will not be described. The operation of the noise suppressing circuit 4 will now be described with noticing an output V1 of the first column of the pixel array 1. First, by the control of the mode setting section 3, the clamp control signal φ CL2 and drive control signal φSL1 are set to high level, and the drive control signal φ SL2 to low level. Next, the sample-and-hold control signal φ SH and clamp control signal φ CL1 are driven to high level so that nodes N2, N3 of the noise suppressing circuit 4 are clamped by a clamp voltage (Vref) 8. At this time, a reset signal Vr is inputted to the noise suppressing circuit 4 from pixel, and the reset signal Vr is sampled by means of the clamping capacitor CCL1. Next, the clamp control signal φ CL1 is brought to low level to end the sampling of the reset signal Vr.

Subsequently, signal (Vr+Vs) where light signal Vs is overlapped on reset signal Vr is inputted to the noise suppressing circuit 4 from pixel. At that time, the node N2 of the noise suppressing circuit 4 attains a voltage GVs obtained by multiplication of the signal Vs, i.e. difference between the previously sampled reset signal Vr and the (Vr+Vs) signal inputted from pixel by a gain G to be determined by the clamping capacitor CCL1 and the sampling capacitor CSH1. After that, the sample-and-hold control signal φ SH is brought to low level to retain the voltage GVs of the node N2 at the sampling capacitor CSH1. It is thus possible for the node N4 to output the same voltage GVs as the node N2. By performing the above operation, it is possible to output the signal GVs which is obtained by amplifying light signal accumulated at the photoelectric conversion section PD of pixel.

Figure 10:
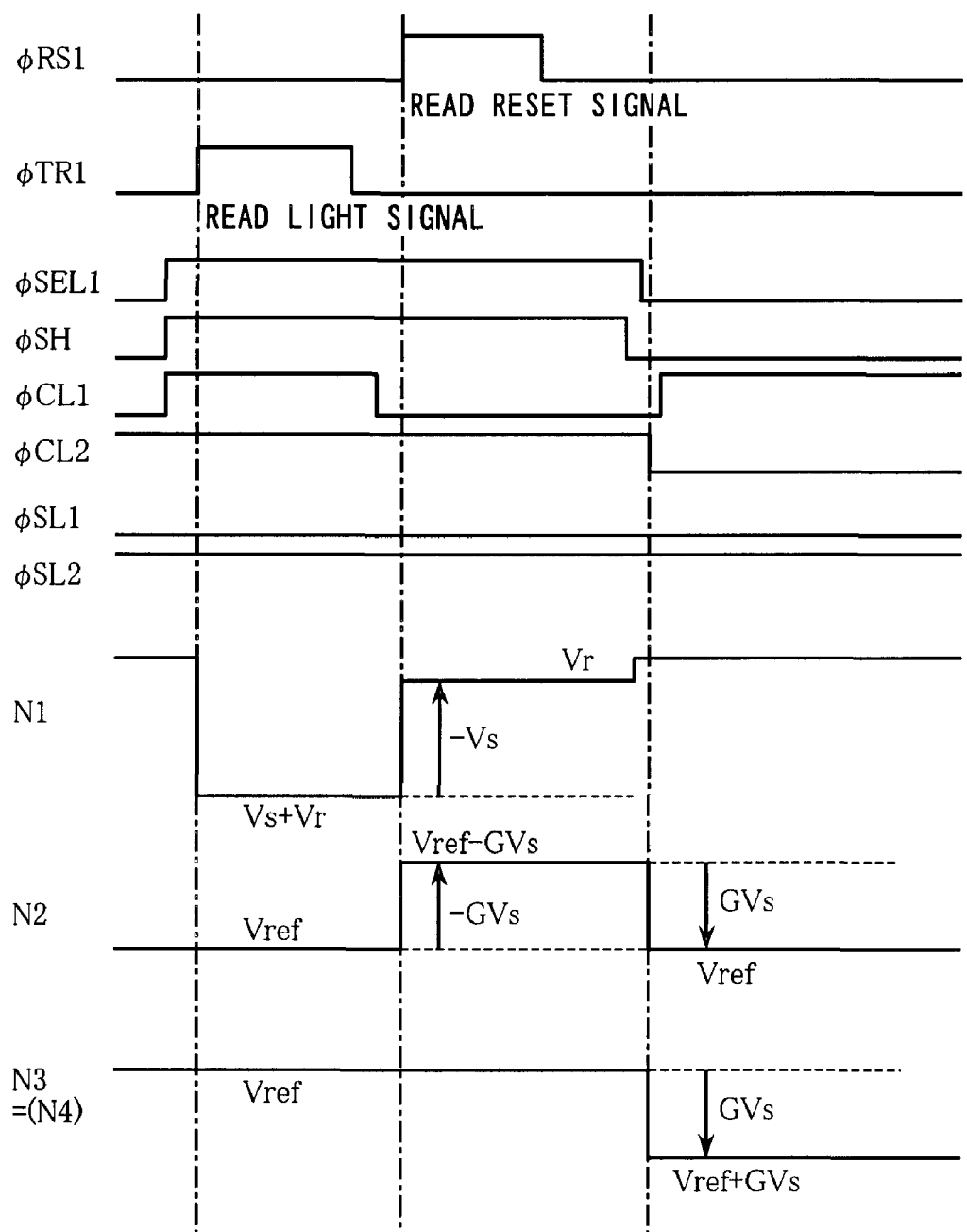
FIG. 10 is a timing chart for explaining an operation for reading a light signal with using a global shutter function in the first embodiment.

An operation for reading light signal with using the global shutter function will be described below with reference to a timing chart shown in FIG. 10. The read operation of pixel is similar to the prior-art example and will not be described. The operation of the noise suppressing circuit 4 will now be described. At first, the drive control signal φ SL2 is set to high level, and drive control signal φ SL1 to low level by the control of the mode setting section 3.

Next, the sample-and-hold control signal φ SH and clamp control signals φ CL1, φ CL2 are driven to high level so that nodes N2, N3 of the noise suppressing circuit 4 are clamped by clamp voltage 8. At this time, signal (Vr+Vs) where light signal Vs is overlapped on reset signal Vr is inputted to the noise suppressing circuit 4 from pixel, and the signal (Vr+Vs) is sampled by means of the clamping capacitor CCL1. Next, the clamp control signal φ CL1 is brought to low level to end the sampling of the signal (Vr+Vs).

Subsequently, reset signal Vr is inputted to the noise suppressing circuit 4 from pixel. The node N2 of the noise suppressing circuit 4 thereby attains a voltage −GVs obtained by multiplication of the signal −Vs, i.e. difference between the previously sampled signal (Vr+Vs) and the signal Vr inputted from pixel by a gain G to be determined by the clamping capacitor CCL1 and the sampling capacitor CSH1. After that, the sample-and-hold control signal φ SH is brought to low level to end the sampling. The clamp control signal φ CL2 then is brought to low level, and φ CL1 to high level. The node N2 thereby attains clamp voltage 8 so that the voltage of the node N3 retains voltage change GVs of the node N2. The voltage of the node N4 thus becomes the same GVs as the node N2.

By performing the above operation, the polarity of output signal of the noise suppressing circuit 4 is unified even when switching of operation between the rolling shutter function and the global shutter function is made by the mode setting section 3 so that it is possible to achieve a reduction in size and lowered power consumption of the circuit. Further, it is also possible to drive the noise suppressing circuit 4 by the above rolling shutter when the pixel array is in the global shutter operation, and to drive the noise suppressing circuit 4 by the above global shutter when the pixel array is in the rolling shutter operation.

Embodiment 2

Figure 11:
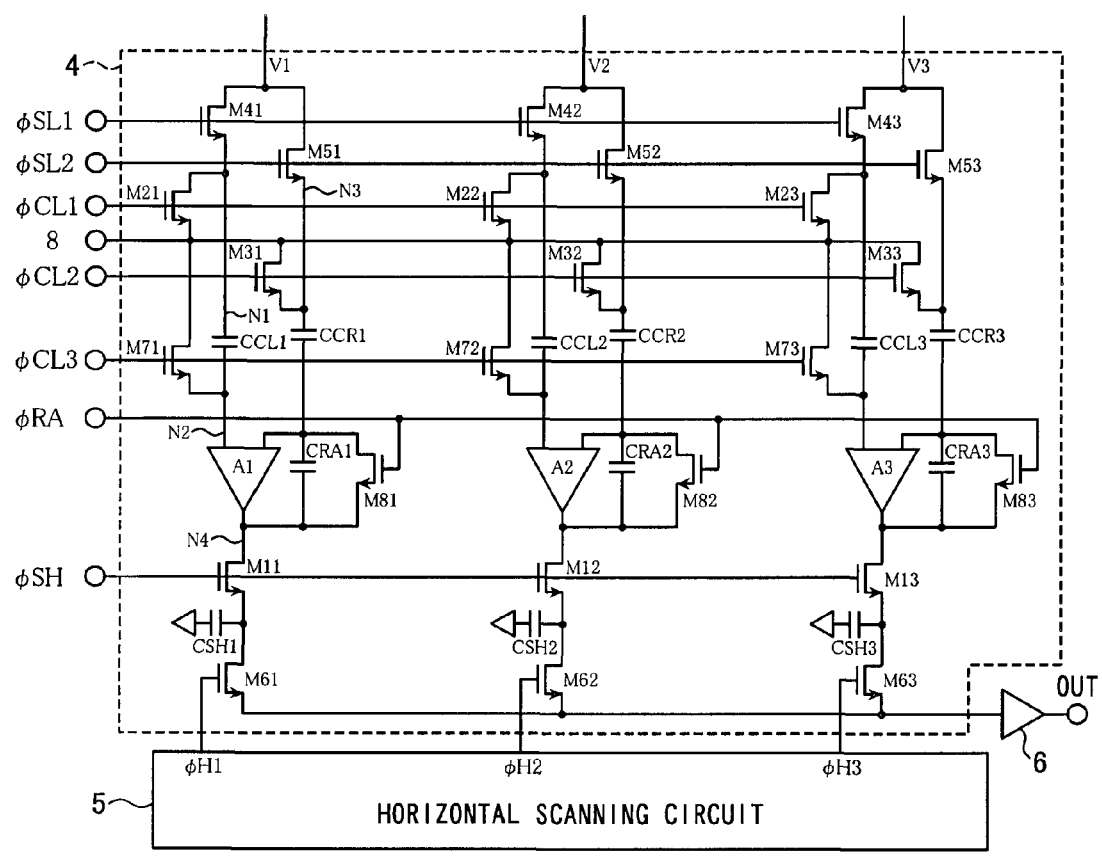
FIG. 11 is a circuit diagram showing construction of the noise suppressing circuit in the solid-state imaging apparatus according to a second embodiment.

A second embodiment will now be described. FIG. 11 is a circuit diagram showing construction of the noise suppressing circuit 4 in the solid-state imaging apparatus according to the second embodiment. Provided in the noise suppressing circuit 4 according to this embodiment corresponding to output V1 of a first column of the pixel array 1 are: clamping capacitors CCL1, CCR1; a feedback capacitor CRA1; a sampling capacitor CSH1; a sample-and-hold switch M11; clamp switches M21, M31, M71; drive switches M41, M51; a feedback switch M81; a feedback amplifier A1; and a horizontal select switch M61. These components are connected as shown in FIG. 11. Circuits having similar construction are connected also to outputs V2, V3 that are from the other columns of the pixel array 1.

The sample-and-hold switch M11 is controlled by a sample-and-hold control signal φ SH, clamp switch M21 by a clamp control signal φ CL1, clamp switch M31 by a clamp control signal φ CL2, and clamp switch M71 by a clamp control signal φ CL3, respectively. Further, the drive switch M41 and drive switch M51 are controlled by drive control signal φ SL1 and drive control signal φ SL2. The feedback switch M81 is to be controlled by a feedback control signal φ RA.

Figure 12:
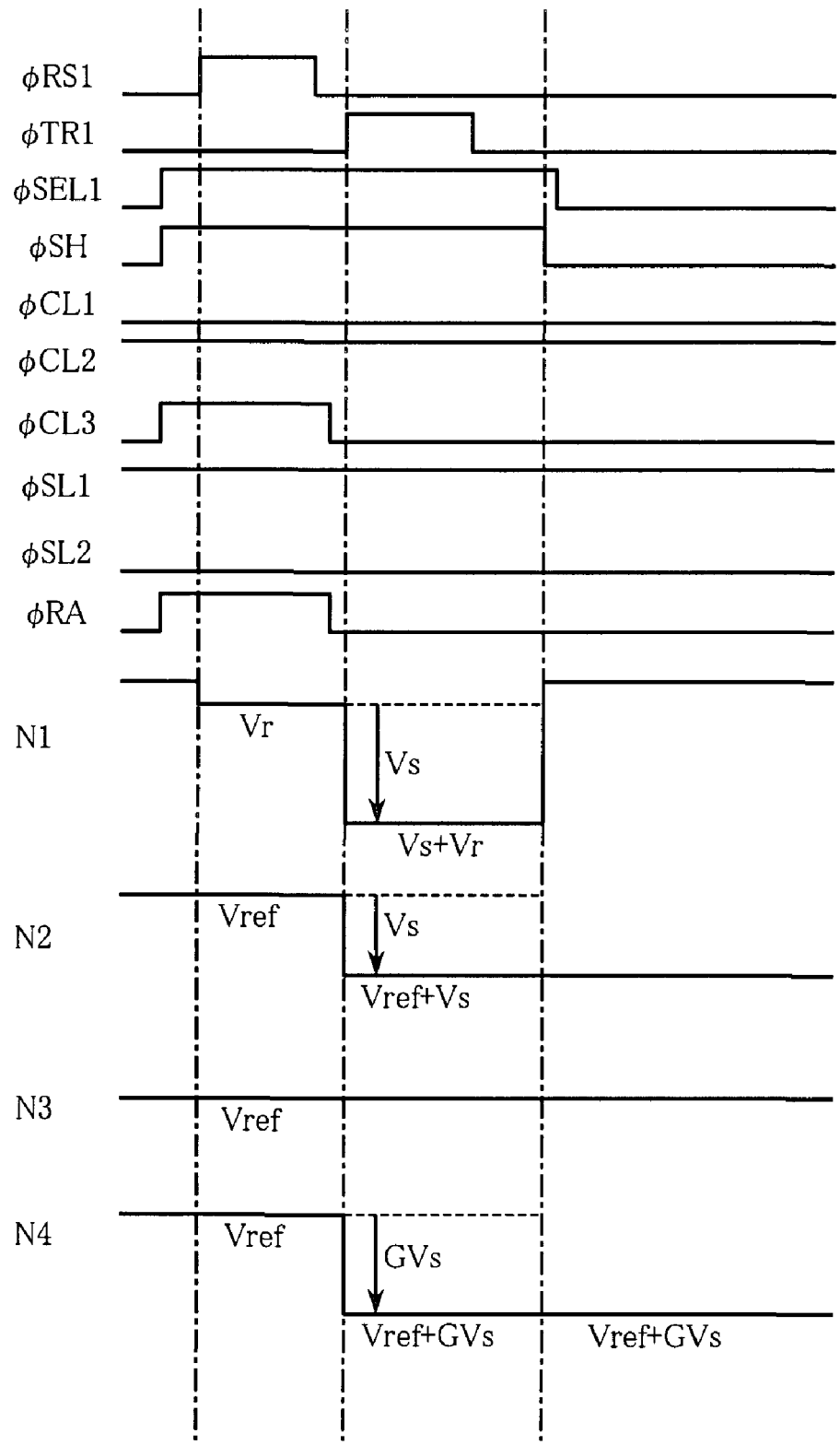
FIG. 12 is a timing chart for explaining an operation for reading a light signal with using the rolling shutter function in the second embodiment.

A description will be given below by way of a timing chart shown in FIG. 12 with respect to an operation for reading a light signal with using the rolling shutter function of the solid-state imaging apparatus according to the second embodiment having thus constructed noise suppressing circuit 4. The read operation of pixel is similar to the prior-art example and will not be described. The operation of the noise suppressing circuit 4 will now be described. First, the clamp control signal φ CL2 and drive control signal φ SL1 are set to high level by the mode setting section 3, and the clamp control signal φ CL1 and drive control signal φ SL2 to low level, respectively, so that node N3 is set to clamp voltage (Vref) 8.

Next, the sample-and-hold control signal φ SH and clamp control signal φ CL3 are driven to high level so that node N2 of the noise suppressing circuit 4 is clamped by the clamp voltage 8. Further, the feedback control signal φ RA is driven to high level to reset the feedback capacitor CRA1. At this time, a reset signal Vr is inputted to the noise suppressing circuit 4 from pixel, and the reset signal Vr is sampled by means of the clamping capacitor CCL1. Next, the clamp control signal φ CL3 is brought to low level to end the sampling of the reset signal Vr, and the feedback control signal φ RA is brought to low level to end the resetting of the feedback capacitor CRA1.

Subsequently, signal (Vr+Vs) where light signal Vs is overlapped on reset signal Vr is inputted to the noise suppressing circuit 4 from pixel. At that time, the node N2 of the noise suppressing circuit 4 attains signal Vs, i.e. difference between the previously sampled reset signal Vr and the (Vr+Vs) signal inputted from pixel. Further, the node N4, i.e. an output of the feedback amplifier A1 attains voltage GVs obtained by multiplying the signal Vs of the node N2 by a gain G to be determined by the clamping capacitor CCR1 and the feedback capacitor CRA1. After that, the sample-and-hold control signal φ SH is brought to low level to retain the output voltage GVs at the sampling capacitor CSH1.

By performing the above operation, it is possible to output the signal GVs which is obtained by amplifying a light signal accumulated at the photoelectric conversion section PD of pixel. It should be noted that gain G is expressed by the following equation.

$$G = CRA1/CCR1$$

Figure 13:
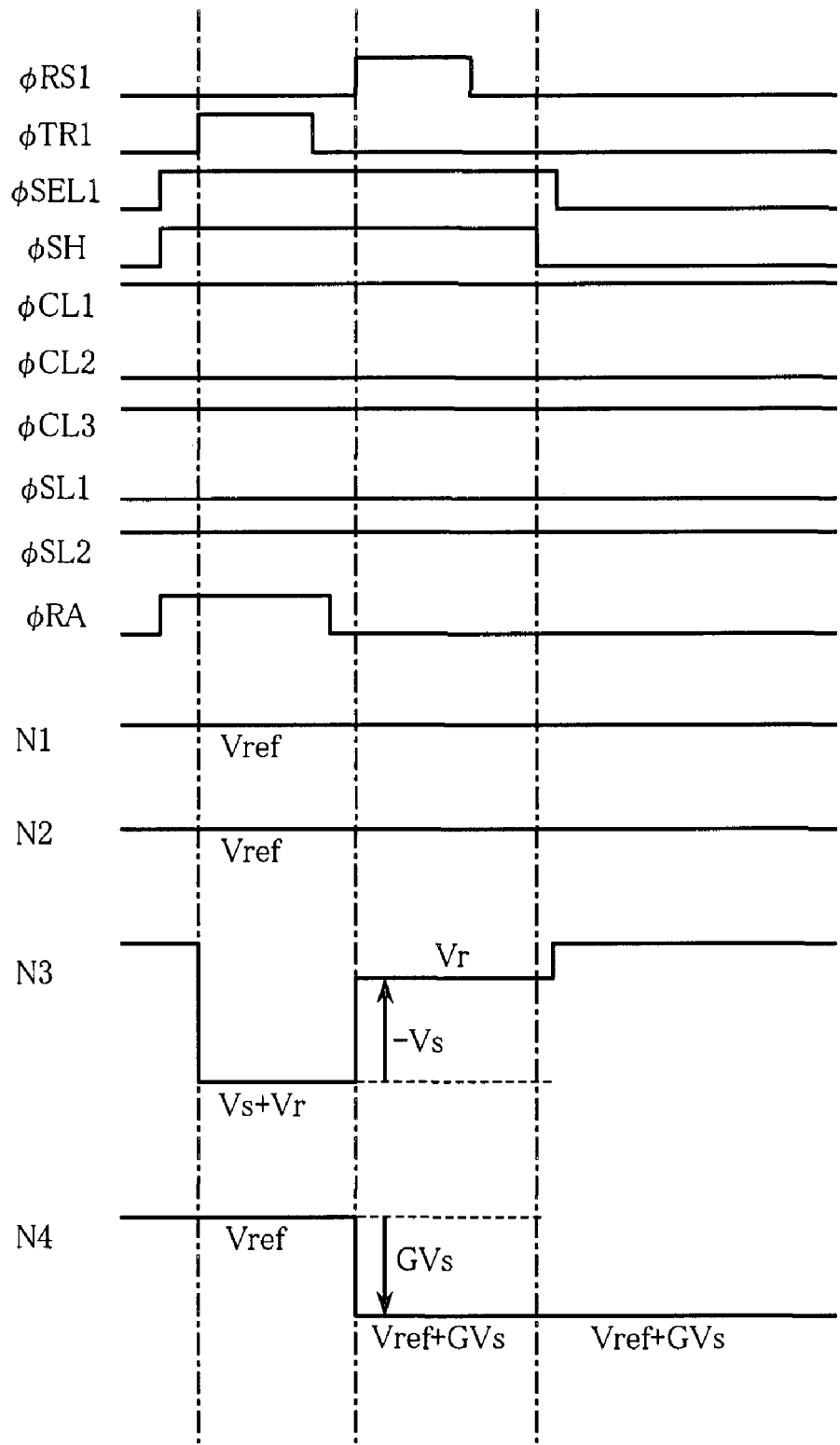
FIG. 13 is a timing chart for explaining an operation for reading a light signal with using the global shutter function in the second embodiment.

An operation for reading a light signal with using the global shutter function will be described below by way of a timing chart shown in FIG. 13. The read operation of pixel is similar to the prior-art example and will not be described. The operation of the noise suppressing circuit 4 will now be described. The clamp control signals φ CL1, φ CL3 and drive control signal φ SL2 are set to high level by the mode setting section 3, the clamp control signal φ CL2 and drive control signal φ SL1 to low level, and nodes N1, N2 to the clamp voltage (Vref) 8. The output of pixel is thereby inputted to the node N3.

Next, the sample-and-hold control signal φ SH and feedback control signal φ RA are driven to high level to reset the feedback capacitor CRA1. At this time, signal (Vr+Vs) where light signal Vs is overlapped on reset signal Vr is inputted to the noise suppressing circuit 4 from pixel, and the signal (Vr+Vs) is sampled by the clamping capacitor CCR1. Next, the feedback control signal φ RA is brought to low level to end the resetting of the feedback capacitor CRA1 and the sampling of signal (Vr+Vs).

Subsequently, reset signal Vr is inputted to the noise suppressing circuit 4 from pixel. At that time, the node N4, i.e. an output of the feedback amplifier A1 attains a voltage GVs obtained by multiplication of −Vs, i.e. a difference between the previously sampled signal (Vr+Vs) and the reset signal Vr by a gain −G to be determined by the clamping capacitor CCR1 and the feedback capacitor CRA1. Subsequently, the sample-and-hold control signal φ SH is brought to low level to retain the output voltage GVs at the sampling capacitor CSH1. It is thus possible to output the signal GVs which is obtained by amplifying light a signal accumulated at the photoelectric conversion section PD of pixel.

With using the above circuit construction to perform the above operation, the polarity of output signal of the noise suppressing circuit 4 is unified even when switching is made between the rolling shutter function and the global shutter function by the mode setting section 3, whereby it is possible to achieve a reduction in size and lowered power consumption of the circuit. Further, it is also possible to drive the noise suppressing circuit 4 by the above rolling shutter when the pixel array is in the global shutter operation, and to drive the noise suppressing circuit 4 by the above global shutter when the pixel array is in the rolling shutter operation.

Embodiment 3

Figure 14:
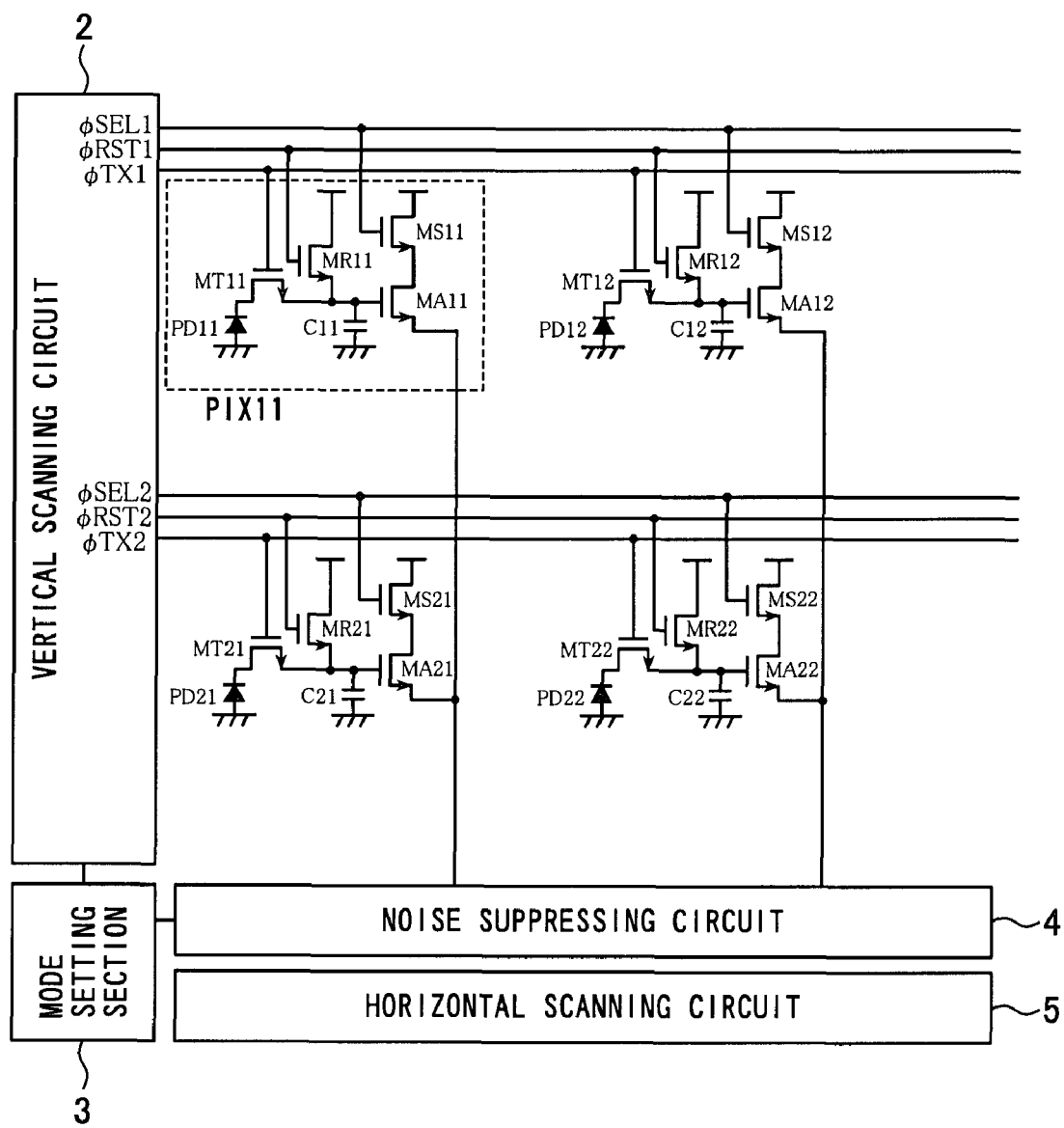
FIG. 14 is a circuit diagram showing a pixel construction in the solid-state imaging apparatus according to a third embodiment.

A third embodiment will now be described. FIG. 14 is a circuit diagram showing in detail the construction of each pixel of a pixel array of the solid-state imaging apparatus according to the third embodiment. Here, only a portion consisting of two rows by two columns of the pixel array is shown. The pixel according to this embodiment is different from the pixel construction in the first and second embodiments in the manner of connection of select switch MS11, 12, 21, 22, and amplification section MA11, 12, 21, 22. The circuit construction and operation of the rest are identical to the first and second embodiments and will not be described. With using the above circuit construction, the polarity of output signal of the noise suppressing circuit is unified even when switching is made between the rolling shutter function and the global shutter function so that it is possible to achieve a reduction in size and lowered power consumption of the circuit.

Embodiment 4

Figure 15:
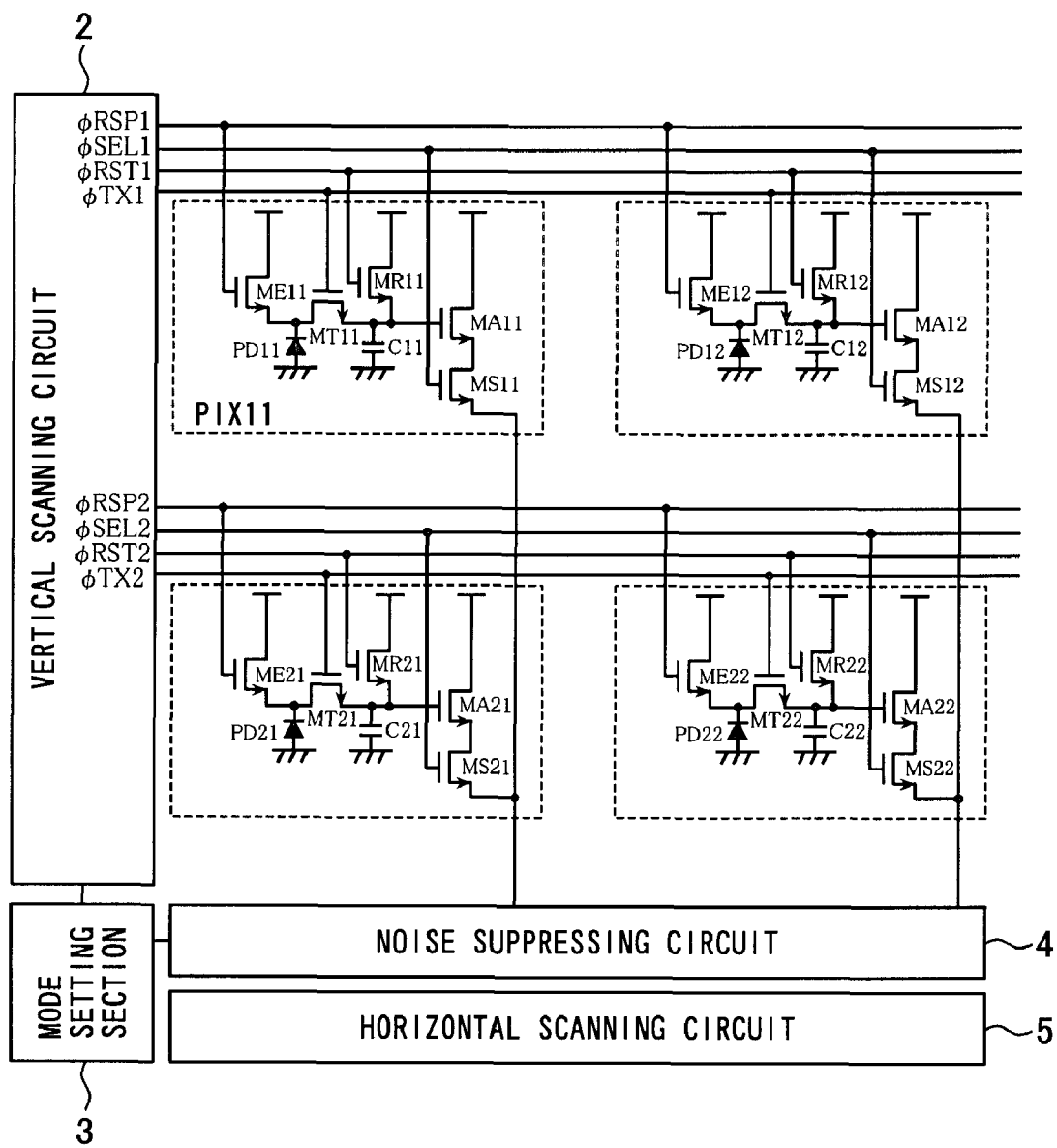
FIG. 15 is a circuit diagram showing a pixel construction in the solid-state imaging apparatus according to a fourth embodiment.

A fourth embodiment will now be described. FIG. 15 is a circuit diagram showing in detail the construction of each pixel of a pixel array of the solid-state imaging apparatus according to the fourth embodiment. This embodiment is different from the first or second embodiments only in its pixel construction and the construction of the rest is identical. The pixel construction of this embodiment will now be described by way of PIX11. Provided within PIX11 are: a photoelectric conversion section PD11; a memory (FD) C11 for accumulating signal generated at the photoelectric conversion section PD11; a transfer switch MT11 for controlling transfer from the photoelectric conversion section PD11 to the memory C11; a reset switch MR11 for resetting the memory C11; an amplification section MA11 for amplifying signal of the memory C11; a select switch MS11 for selecting the pixel; and a discharging switch ME11 for discharging signal generated at the photoelectric conversion section PD. These components are connected as shown in FIG. 15 and are two-dimensionally arranged.

The transfer switch MT11 is controlled by a transfer control signal φ TX1; the reset switch MR11 is controlled by a reset control signal φ RST1; and the discharging switch ME11 is controlled by the discharging control signal φ RSP1. The select switch MS11 is controlled by a select control signal φ SEL1 so that signals of the selected row (first row) are outputted to the noise suppressing circuit 4. Signal of a value from which reset variance of pixel is removed is retained at the noise suppressing circuit 4. Subsequently, the signal retained at the noise suppressing circuit 4 is read out by the horizontal scanning circuit 5.

Also in the case of using a pixel array consisting of pixels having the above construction, switching is made between the rolling shutter function and the global shutter function by means of mode setting similar to that shown in the first and second embodiments to unify the polarity of output signal of the noise suppressing circuit so that a reduction in size and lowered power consumption of the circuit can be achieved. In the case of the pixel construction of this embodiment, an accumulation time at the time of global shutter drive can be flexibly set.

Embodiment 5

Figure 16:
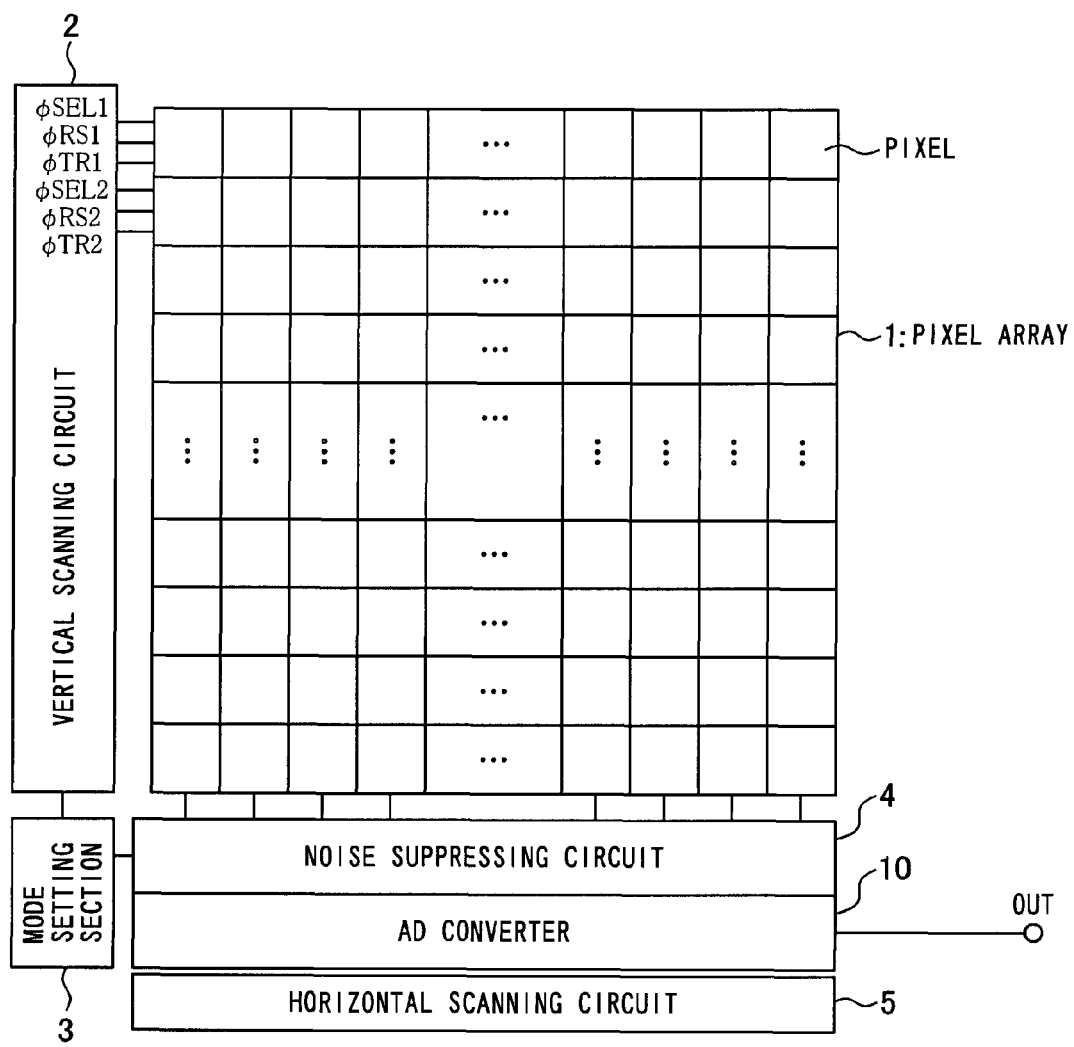
FIG. 16 is a block diagram showing construction of the solid-state imaging apparatus according to a fifth embodiment.

A fifth embodiment will now be described. FIG. 16 is a block diagram showing construction of the solid-state imaging apparatus according to the fifth embodiment. In this embodiment, the solid-state imaging apparatus according to the first or second embodiment has a construction where an analog-to-digital converter (AD) 10 is disposed at the respective output of each column of the noise suppressing circuit 4. The construction of pixel array 1 and noise suppressing circuit 4 is similar to the first and second embodiments and will not be described. The pixel operation and the drive of the noise suppressing circuit 4 are also similar to the first and second embodiments and will not be described.

With using such construction, the polarity of digital output signal outputted through the AD converter 10 is unified even when switching is made by the mode setting section 3 between the rolling shutter function and the global shutter function so that a reduction in size and lower power consumption of the circuit can be achieved.

Embodiment 6

Figure 17:
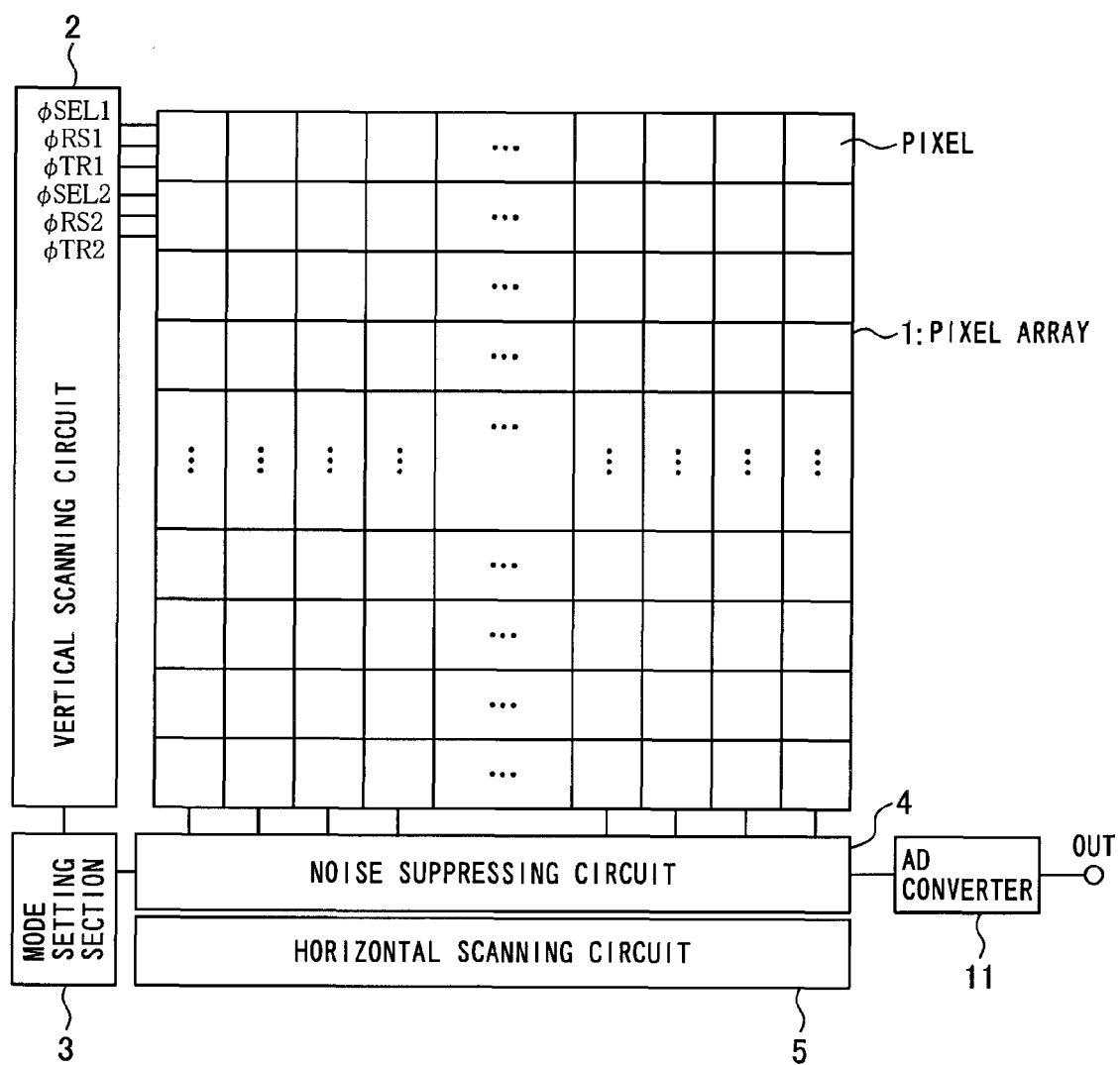
FIG. 17 is a block diagram showing construction of the solid-state imaging apparatus according to a sixth embodiment.

A sixth embodiment will now be described. FIG. 17 is a block diagram showing construction of the solid-state imaging apparatus according to the sixth embodiment. In this embodiment, the solid-state imaging apparatus according to the first or second embodiment has a construction where the outputs of the columns of the noise suppressing circuit 4 are connected to a single analog-to-digital converter 11. The pixel construction and the construction of the noise suppressing circuit 4 are similar to the first and second embodiments and will not be described. The pixel operation and the drive of the noise suppressing circuit 4 are also similar to the first and second embodiments and will not be described.

With using such construction, the polarity of digital output signal outputted through the single AD converter 11 is unified even when switching is made by the mode setting section 3 between the rolling shutter function and the global shutter function so that a reduction in size and lower power consumption of the circuit can be achieved.

According to the invention as has been described by way of the above embodiments, since the noise suppressing circuit has a switching section for switching the polarity of a difference between first and second signals that are different in characteristic due to pixel, the polarity of output of the noise suppressing circuit can be unified even when the read mode such as the rolling shutter operation or global shutter operation is switched, whereby a reduction in size and lower power consumption of the circuit can be achieved.

What is claimed is:

1. A solid-state imaging apparatus comprising:
    a mode setting section configured to set a first read mode and a second read mode;
    a pixel section with a plurality of pixels arranged into two dimensions, wherein each of the plurality of pixels outputs any of a first signal and a second signal, and wherein each of the plurality of pixels has a photoelectric conversion section configured to effect photoelectric conversion, an accumulation section configured to temporarily store a signal generated at said photoelectric conversion section, a transfer means configured to transfer said signal of said photoelectric conversion section to said accumulation section, a reset means configured to reset said accumulation section, an amplification means configured to amplify and output an electric potential of said accumulation section, and a select means configured to select said amplification means; and
    a noise suppressing circuit configured to work out noise suppressed signal from a difference between the first signal and the second signal, and suppress a variance of a signal at the time of reset of each pixel,
    wherein the difference between the first signal and the second signal in the first read mode is opposite in polarity to the difference between the first signal and the second signal in the second read mode,
    wherein the noise suppressing circuit has a switch section configured to switch a connection in the noise suppressing circuit such that the noise suppressed signal in the first read mode is same in polarity as the noise suppressed signal in the second read mode.

2. The solid-state imaging apparatus according to claim 1, wherein in the first read mode, a reset signal is caused to be outputted from said pixel as the first signal after resetting said accumulation section, and said signal subsequently generated at said photoelectric conversion section is transferred to said accumulation section and is caused to be outputted as the second signal,
    wherein in the second read mode, said accumulation section is reset, and, after subsequently transferring said signal generated at said photoelectric conversion section to said accumulation section and causing it to be outputted from the pixel as the first signal, a resetting of said accumulation section is effected to output a reset signal from the pixel as the second signal.

3. The solid-state imaging apparatus according to claim 2, wherein, when the second read mode is set, said transfer means is controlled so that signals generated at said photoelectric conversion section are transferred concurrently of all pixels to the accumulation section.

4. The solid-state imaging apparatus according to claim 1 further comprising an analog-to-digital converter for converting an analog output signal of said noise suppressing circuit into a digital signal.

* * * * *